(12) United States Patent
Rigaudeau et al.

(10) Patent No.: US 6,793,716 B2
(45) Date of Patent: Sep. 21, 2004

(54) METHOD AND INSTALLATION FOR CLEANING A PARTICULATE FILTER ON A MOTOR VEHICLE

(75) Inventors: Christine Rigaudeau, Puteaux (FR); Christian Walter, Montigny-le-Bretonneux (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 55 days.

(21) Appl. No.: 10/268,092

(22) Filed: Oct. 10, 2002

(65) Prior Publication Data

US 2003/0079607 A1 May 1, 2003

(30) Foreign Application Priority Data

Oct. 15, 2001 (FR) .............................. 01 13281

(51) Int. Cl.[7] .......................... B01D 46/04; B01D 41/00
(52) U.S. Cl. ............................. 95/281; 96/233; 134/2; 134/20; 134/22.1; 134/166 R; 422/178
(58) Field of Search ............................. 95/281; 96/228, 96/233; 422/178; 55/282.3, DIG. 10, DIG. 30; 60/311, 299; 134/2, 1, 19, 20, 20.1, 22.18, 34, 26, 42

(56) References Cited

U.S. PATENT DOCUMENTS

| | | | | |
|---|---|---|---|---|
| 2,178,701 A | * | 11/1939 | Petre | 134/33 |
| 2,194,607 A | * | 3/1940 | McDevitt | 366/262 |
| 2,615,456 A | * | 10/1952 | Galusha | 134/140 |
| 2,919,704 A | * | 1/1960 | Butler | 134/102.1 |
| 3,216,429 A | * | 11/1965 | Dick | 134/102.1 |
| 3,538,926 A | * | 11/1970 | Nesbitt | 134/102.3 |
| 3,608,567 A | * | 9/1971 | Neill, Jr. | 134/58 R |
| 3,613,700 A | * | 10/1971 | Werth et al. | 134/57 R |
| 3,888,694 A | * | 6/1975 | McKinney | 134/32 |
| 4,049,555 A | * | 9/1977 | Matherne | 210/409 |
| 5,042,516 A | * | 8/1991 | Chaney | 134/169 R |
| 5,298,079 A | * | 3/1994 | Guymon | 134/16 |
| 5,361,790 A | * | 11/1994 | Park et al. | 134/95.3 |
| 5,833,766 A | * | 11/1998 | Osterwald et al. | 134/22.12 |
| 6,277,209 B1 | * | 8/2001 | Yamada et al. | 134/28 |
| 6,394,113 B1 | * | 5/2002 | Hatanaka et al. | 134/184 |
| 6,638,361 B2 | * | 10/2003 | Hatanaka et al. | 134/1 |
| 2003/0079607 A1 | * | 5/2003 | Rigaudeau et al. | 95/212 |

FOREIGN PATENT DOCUMENTS

| | | |
|---|---|---|
| DE | 117811 | 2/1976 |
| DE | 198 34 942 A1 | 2/2000 |
| EP | 1 060 780 A1 | 12/2000 |
| FR | 2 716 122 | 8/1995 |
| FR | 2 794 992 | 12/2000 |
| FR | 2 823 990 | 10/2002 |

* cited by examiner

*Primary Examiner*—Duane S. Smith
(74) *Attorney, Agent, or Firm*—Westerman, Hattori, Daniels & Adrian LLP

(57) ABSTRACT

The particulate filter is disassembled in order to separate it from the exhaust line and the filtering support of the particulate filter is contacted with a cleaning solution, for example contained in a tank, for a period sufficient to ensure soaking of the filtering support, thereby facilitating the detachment of residues retained in the filtering support.

23 Claims, 2 Drawing Sheets

METHOD AND INSTALLATION FOR CLEANING A PARTICULATE FILTER ON A MOTOR VEHICLE

TECHNICAL FIELD

The invention relates to a method for cleaning a particulate filter for pollution control of exhaust gases from a motor vehicle engine.

BACKGROUND TO THE INVENTION

The exhaust gases of diesel engines which use gas oil as fuel contain both gaseous pollutants such as unburned hydrocarbons and nitric oxides or carbon monoxides, and solid pollutants which are chiefly made up of soot particles. The pollution control standards applying to diesel engines necessitate increasingly advanced elimination of soot particle emissions in the exhaust gases of these engines.

In order to ensure the elimination of soot particles, it is necessary to post-treat the exhaust gases using a particulate filter.

Such a particulate filter is installed in the engine's exhaust line and has at least one filtration element constituted by a filtering support with a porous structure, if appropriate associated with another pollution control element, fixed in a metal casing which is connected to the exhaust line. The filtering support or supports disposed in the metal casing of the filter, which are known as "canning", may be constituted by porous ceramic elements. The exhaust gases pass through the filtering support between a filter inlet end and a filter outlet end, thereby enabling the solid particles of soot to be retained in suspension in the exhaust gases, so as to obtain a purified gas on the output side. The particulate filter may be arranged downstream of a catalyser.

In the course of the engine's operation, the filtering support becomes laden with soot particles which deposit themselves in the filtering support, with the result that the filter becomes progressively clogged up. Unclogging the filter can be done by burning the soots deposited in the filtering support, along that same exhaust line, whilst the motor vehicle is in use.

In the presence of oxygen, the soots burn at temperatures of the order of 550° C. to 600° C. The exhaust gases of a diesel engine on a touring vehicle only seldom reach such thermic levels. Accordingly, it is necessary to encourage the filtration elements to begin regenerating by adding a fuel additive that enables the combustion temperature of the soots to be lowered.

The additives may be made up of mineral compounds in solution in an organic solvent which, mixed in certain proportions into the gas oil, follow the gas oil circuit. They are thus injected via the injection system into the combustion chamber, and their combustion residues are contained in the exhaust gases.

The presence of these additives in the particulate filter where they are intimately mixed with the soot particles allows them to act as a catalyser during combustion of the soot particles and to lower the soot ignition temperatures to approximately 350° C. to 550° C.

The combustion of soots in the particulate filter—catalysed if appropriate—makes it possible to remove the organic compounds and the carbon contained in these soots. However, once the filter has finished regenerating by combustion, mineral residues are left behind which are retained in the filtering support. These mineral residues are in particular made up of residues derived from additives that aid soot combustion, other additives incorporated in the gas oil, together with a lubricant; these residues may also be made up of particles caused by engine wear or coming from the environment outside, when such particles are not retained by the engine's air filter. All these residues remain stored in the filtering support of the particulate filter. From the aspect of chemical composition, many types may be present in these residues, for example oxides, sulphates, nitrates or phosphates of elements such as cerium, zinc, calcium, copper, iron or nickel.

The particulate filter progressively becomes choked and, after operating for a certain time in the exhaust line, the clogging of the filtering support may be such that it results in a deterioration in engine performance and a rise in fuel consumption. In order to restore satisfactory filter operating conditions it is then necessary to either replace the filter with a new filter or clean the filter.

Given the high cost of particulate filters, it may be financially beneficial to avoid having to replace the filter.

French patent applications 9907682 and 0105582 have proposed methods for cleaning a particulate filter that involve passing through the filtering support of the particulate filter, in the direction running from the outlet end to the inlet end of the filter, a stream of cleaning fluid capable of dissolving or detaching the residues deposited in the channels or pores of the filtering support of the particulate filter. In order to improve the cleaning action involved in these methods, a pressurised gas such as air capable of flushing through the cleaning fluid and the detached or dissolved residues may be put through the filter.

It is also possible to perform rinsing phases by passing water through the filter, and hot-air drying phases.

These methods, which make it possible to restore the particulate filters on motor vehicles after they have been in use for some time, necessitate relatively complex and costly installations which incorporate means for injecting fluid or gas through the particulate filters and means for automatically controlling the different successive phases of the cleaning operation.

The cleaning operations must be performed in specialised workshops or factories fitted out with cleaning installations which must be used to regenerate large numbers of particulate filters, thereby justifying the high cost of these installations.

Furthermore, in the case of certain particularly tenacious residues it is very difficult, within a limited period, to make the residues dissolve or loosen sufficiently.

It is therefore the object of this invention to propose a method for cleaning a particulate filter that has a filtering support with a porous structure, associated with a catalyser if appropriate, fixed in a metal casing having an inlet port and an outlet port, when in service the casing of the filter being joined to an upstream section of an exhaust line of a motor vehicle by its inlet port and to a downstream section thereof by its outlet port, so that passing through the filter, between the inlet port and the outlet port, is a stream of exhaust gases from the motor vehicle's engine containing particles of soot, of which at least a proportion that is retained by the filtering support undergoes combustion by being heated up in the filtering support, said combustion being catalysed if appropriate, so as to regenerate the filter in the exhaust line, the cleaning process making it possible to facilitate the removal of mineral residues that are clogging up the filter following regeneration of the particulate filter by combustion and to remove some or all of the residues, without the use of a complex and costly installation.

SUMMARY OF THE INVENTION

To this end:

at least part of the exhaust line containing the particulate filter is disassembled in order to separate it from the motor vehicle; and the filtering support is contacted with a cleaning solution for a period of time sufficient to ensure that the filtering support is soaked, so as to ensure or facilitate the detachment of the residues retained in the filtering support.

The method according to the invention may be implemented in accordance with one of the following modalities:

at least part of the filter containing the filtering support is introduced into a cleaning solution and the filtering support is kept in the cleaning solution to soak it;

the filtering support is introduced into and held in the cleaning solution in a position such that an axis of the filter and of the filtering support pointing in the direction in which the gases circulate between the inlet port and the outlet port of the filter is substantially vertical, and in a direction such that an exhaust gas inlet end is located beneath an outlet end in the filtering support;

the filtering support is introduced into and held in the cleaning solution in a position such that the axis of the filter and of the filtering support pointing in the direction in which the gases circulate between the inlet port and the outlet port is substantially horizontal, soaking of the filter being done with the filter's outlet port obturated;

the cleaning fluid is introduced inside the filter casing and soaking of the filtering support is done inside the filter casing;

in a second cleaning phase, a stream of cleaning fluid is passed through the filtering support of the particulate filter, between an outlet end and an inlet end;

the cleaning fluid is maintained at room temperature while the filtering support of the filter is being soaked;

the cleaning fluid is heated to a temperature substantially higher than room temperature while the filtering support of the filter is being soaked;

during the cleaning operation consisting in soaking the filtering support of the filter, the cleaning fluid is agitated by one of the following means: mechanical agitation, ultrasonic agitation and circulating the cleaning solution by means of a pump;

displacement or agitation of the particulate filter is produced during the cleaning-by-soaking operation, in order to facilitate the detachment of residues deposited in the filtering support of the filter;

the part of the filter that includes the filtering support is introduced into the cleaning solution contained in a cleaning tank, a remaining part of the filter that includes the outlet port of the filter casing being sited above the level of the cleaning solution in the soaking tank, and the level of the cleaning solution in the tank is maintained at a substantially constant position;

the outlet port of the filter casing is hermetically sealed following immersion of the filtering support in the cleaning solution, thereby preventing the cleaning solution from passing through the outlet port of the filter casing;

at the end of the soaking operation to clean the filtering support of the particulate filter, the filtering support of the particulate filter is subjected to rinsing and drying;

processing and regeneration of the cleaning solution containing the particulate filter cleaning residues, either dissolved or in suspension, is carried out;

after disassembling the part of the exhaust line that contains the particulate filter, regeneration of the filtering support of the particulate filter is carried out by combustion of the soots present in the filtering support using one of the following methods:

i) holding the particulate filter in an oven at a temperature ensuring combustion of the soots, ii) passing a hot gas such as air through the filtering support of the particulate filter, so as to ensure combustion of the soots present in the filtering support; and iii) thereafter placing the filtering support of the particulate filter in contact with the cleaning solution;

the filter is regenerated on the exhaust line of the motor vehicle, prior to disassembling the part of the exhaust line that contains the particulate filter.

The invention also relates to an installation for cleaning particulate filters.

The cleaning of a particulate filter in accordance with the present invention may be carried out in a phase prior to a cleaning operation performed in accordance with one of the methods outlined in French patent applications 9907682 and 0105582; soaking the filtering support makes it easier to detach or dissolve the residues. Alternatively, soaking may be followed solely by an operation involving rinsing and drying the filtering support.

BRIEF DESCRIPTION OF DRAWINGS

To enable the invention to be readily understood, there now follows a description, given by way of example and referring to the accompanying figures, of several embodiments of a particulate filter cleaning method in accordance with the invention.

DESCRIPTION OF PREFERRED EMBODIMENTS

Figure 1:
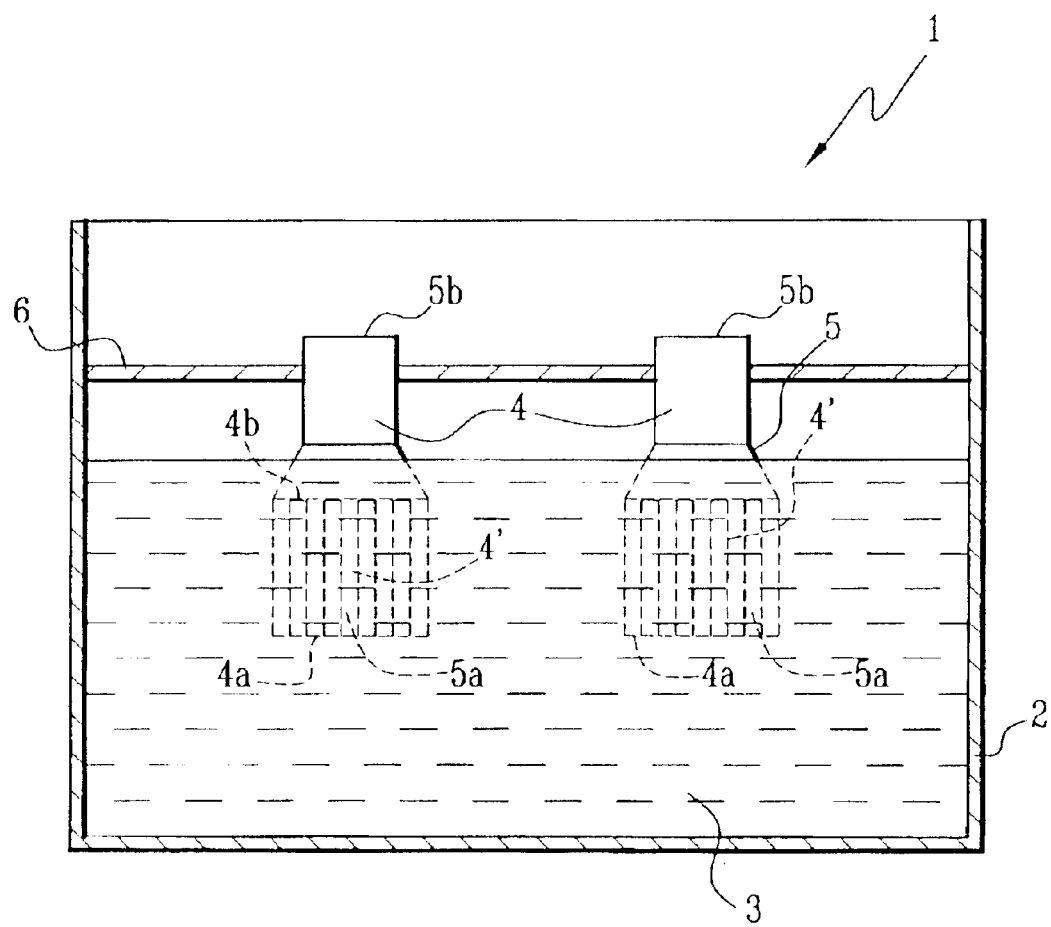
FIG. 1 is an elevational view in cross-section of a soaking tank for particulate filters, in which particulate filters are arranged for cleaning by soaking them.

After a motor vehicle with a diesel engine having an exhaust line incorporating a particulate filter has been operating for some time, said operating period for example corresponding to a distance of the order of 80,000 km travelled by the vehicle, it may prove necessary to carry out cleaning of the particulate filter in order to restore engine performance and to limit fuel consumption.

Prior to the cleaning operation proper, it is checked that the filter has been regenerated by combustion of the soot particles contained in the filtering support. All the organic compounds and the carbon-containing structures contained in the soots have been burned, but the filtering support contains various types of mineral residues which obstruct its pores and its channels and cause the filter to become choked.

Initially all or part of the exhaust line is removed so as to separate from the motor vehicle the particulate filter or a section of the exhaust line containing the particulate filter. More particularly, where the filtering support of the particulate filter is contained in a demountable casing or "canning", the casing is separated from the exhaust line and the particulate filter unit comprising the filtering support inside the canning is taken to a soaking and cleaning installation of the type illustrated in the drawing.

Prior to cleaning the particulate filter, it may be necessary or desirable to complete or perform regeneration of the filter, by combustion of the soots still present in the filter. To do this, the filter having been separated from the exhaust line may be placed in an oven and brought to a temperature that ensures complete combustion of the soots. The filter may also be connected to an installation that allows a hot gas such as air to be injected through the filter in order to ensure combustion and removal of the soots.

In the case of a first embodiment illustrated in FIG. 1, the soaking and cleaning installation, which is designated overall by reference number 1, chiefly includes a soaking tank 2 into which a cleaning solution 3 has been introduced. The cleaning solution may be an aqueous solution containing various cleaning additives, or some other cleaning solution, for example one based on organic solvents.

The particulate filters 4 which have been separated from the exhaust line incorporate the casing or canning 5, inside which the filtering support 4' is placed. The canning 5 has an inlet port 5a at which, on the exhaust line, it is connected to the upstream section of the exhaust line giving access to a first face, or inlet face 4'a, of the filtering support, and a second port or outlet port 5b connected, on the exhaust line, to the downstream section of the exhaust line which gives access to a second face 4'b, or outlet face, of the filtering support 4'.

The exhaust gases pass through the particulate filter in an axial longitudinal direction of the filter, running from the inlet port 5a to the outlet port 5b.

To carry out the cleaning of the filters on the soaking and cleaning installation 1 represented in FIG. 1, the filters containing the canning 5 and the filtering support 4' are fastened inside the canning, onto a support 6 situated above the upper level of the cleaning fluid in the tank 2, such that the longitudinal direction or axis of the filters is vertical and the inlet end 4'a of the filtering support 4' is beneath the outlet end 4'b. The filters are fastened to the support 6 above the level of the cleaning fluid in the vicinity of the outlet port 5b. The filtering support 4' of the filter positioned with its longitudinal axis in the vertical direction is immersed in the cleaning fluid.

The downstream section of the particulate filter containing the outlet port 5b of the casing 5 remains above the upper level of the cleaning fluid during the soaking operation.

Generally speaking, the level of the cleaning fluid (as represented in FIG. 1) is maintained slightly above the outlet end 4'b of the filtering element 4' and substantially below the outlet port 5b of the casing 5, level with which the filter 4 is fastened onto the support of the soaking tank 2, so as to avoid any possibility of cleaning solution 3 being introduced into the filter via its outlet port.

The filtering supports of the particulate filters have channels running longitudinally, the porous side walls of which ensure that the exhaust gases are filtered and the soot particles are stopped. The filtration channels are obturated at their end situated level with the outlet end 4'b of the filtering support 4'. The exhaust gases pass through the side wall of the filtration channels and penetrate into evacuation channels positioned around the filtration channels which are obturated level with the inlet face 4'a of the filtering element 4' and open level with the outlet face 4'b.

The soot particles build up on the walls of the filtration channels which are closed level with the outlet face 4'b. The filtering elements of the particulate filters are generally clogged by the combustion residues of the soots, chiefly towards the outlet of the filtration channels, near to the outlet face 4'b of the filtering element 4'.

During soaking of the filters 4, as represented in FIG. 1, the cleaning solution penetrates into the channels of the filtering support until it reaches a level close to the upper level of the cleaning solution in the tank 2, said level being situated a little above the outlet face or end 4'b of the filtering support 4'. During the soaking operation, the cleaning solution ensures that residues dissolve and are detached, especially in the downstream sections of the filtration channels of the filtering support 4', with the detached or dissolved residues being carried along by gravity in the bottom of the cleaning tank 2.

The fact that the cleaning solution does not get as far as the downstream section of the filter in the vicinity of the outlet port prevents residues from the most severely clogged part of the filter from being carried along in the bottom of the filtration channels towards the wall of the evacuation channels, which is not clogged.

The particulate filters 4 may be kept inside the cleaning tank 2 for a period of a few minutes to several hours, for example for a period of from two minutes to 24 hours.

Figures 2A, 2B:
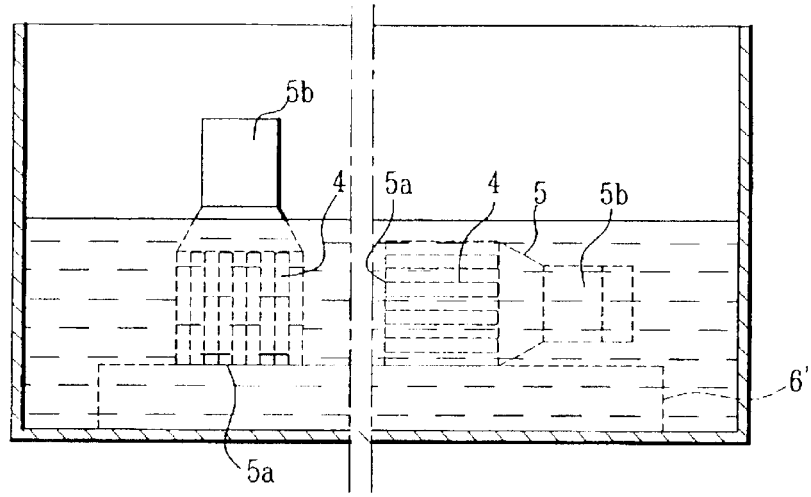
FIGS. 2A and 2B are elevational views in cross-section similar to the view in FIG. 1, showing two alternative methods of cleaning a filter by soaking it in a cleaning tank.

FIGS. 2A and 2B show two variants of the method of soaking and cleaning the filter 4 inside a cleaning tank 2 containing a cleaning solution. The filter 4, instead of being suspended from a support 6 as in the case of the embodiment depicted in FIG. 1, rests on a support 6' immersed in the cleaning tank 2. The support 6' preferably has a filter 4 supporting surface constituted by a grille or perforated metal sheet.

During the soaking operation inside the cleaning tank 2, the filter 4 may be positioned with its axis vertical (FIG. 2A). It then rests on the support 6', level with the inlet port 5a of the casing 5.

The filter may also be positioned with its axis horizontal (FIG. 2B). The outlet port 5b of the casing 5 is then preferably obturated with a stopper in order to prevent the cleaning fluid from entering said port which is immersed.

FIGS. 3A, 3B, 3C and 3D show four alternative ways of implementing the method according to the invention for soaking the filtering support 4' of the filter 4 inside the metal casing 5. The filter 4 is placed in a holding tank 2' designed to collect any cleaning solution during or after filling of the metal casing 5 of the filter 4.

Figures 3A, 3B, 3C, 3D:
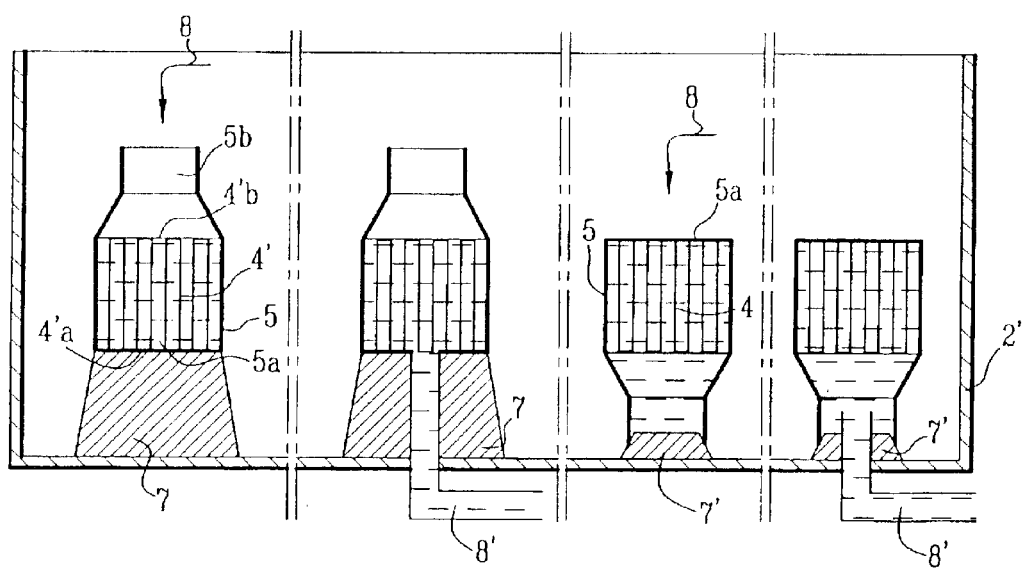
FIGS. 3A to 3D are elevational views in cross-section showing four alternative methods of cleaning a filter by soaking the filtering support inside the metal casing of the filter.

In FIG. 3A, which relates to a first embodiment of the method for soaking the filtering support 4' in the cleaning solution inside the metal casing 5 of the filter vertically arranged in the holding tank 2', the metal casing 5 of the filter is shown resting with its end that incorporates the inlet port 5a against the bottom of the tank 2', via a unit 7 for stopping up the inlet end 4'a of the filtering support 4' which is rigidly joined to the bottom of the holding tank 2'. The cleaning solution is introduced into the filter casing 5 via its outlet port 5b, as represented by the arrow 8, generally until it is level with the outlet end 4'b of the filtering support. The cleaning solution is kept in contact with the fully immersed filtering support 4' for a sufficient time to ensure that mineral residues deposited in the filtering support 4' become detached therefrom.

FIG. 3B relates to a second form of embodiment. The filter 4 rests on the stopper unit 7 via the end thereof that incorporates the inlet port 5a. The operation of filling the filter casing 5 is carried out from the bottom, via a cleaning solution feed conduit 8' which passes through the bottom of the tank 2' and the stopper unit 7.

In FIG. 3C the filter 4 rests, via the end of the casing 5 incorporating the outlet port 5b which is thus obturated, on a stopper 7' rigidly joined to the bottom of the tank 2'. As represented by the arrow 8, the filling of the filtering support 4' and of the casing 5 with cleaning solution is done via the outlet port 5a of the metal casing 5.

In the case of the variant represented in FIG. 3D, the filling of the filter with cleaning fluid is done via the conduit 8' which passes through the stopper 7'.

The cleaning-by-soaking operation may be followed by a cleaning operation involving passing cleaning fluid through the filter in accordance with the methods of patents 9907682 and 0105582. In this case the number of cleaning cycles carried out to implement these methods may be reduced on account of the fact that soaking encourages detachment and dissolving of the residues.

By judicious choice of the cleaning solution and soaking conditions it is possible to carry out complete cleaning of the particulate filters by soaking them, without subsequently cleaning them by passing liquid into the particulate filters as in the prior art methods.

In all cases it is preferable to follow up the cleaning-by-soaking operation (if necessary followed by cleaning by passing liquid through the filter) with rinsing of the filter, generally in water, and drying of the filter, generally using hot air.

The filter may then be refitted on the exhaust line of a motor vehicle.

Depending on the nature of the cleaning solution employed, the latter may be kept at room temperature in the soaking tank or filter casing 5 for the entire soaking time or, conversely, heated to a temperature that may be substantially higher than room temperature.

However, said temperature must be lower than the temperature at which the cleaning solution boils. For example, in the case of an aqueous solution the solution may be used at a temperature of, say, between 50° C. and 80° C.

The cleaning solution may be agitated inside the soaking tank 2 or filter casing 5 while the filters are being soaked, thereby activating the renewal of the cleaning solution in contact with the residues deposited in the filtering support. Agitation of the solution may be obtained by means of a mechanical device, ultrasonically or by using a pump to circulate water or cleaning fluid in the soaking tank 2 or filter casing 5.

The filters themselves may be moved or agitated during soaking, so as to facilitate the detachment of the combustion residues deposited in the channels of the filtering support. For example, the support 6 or both it and the tank 2' may have a vibrating plate which transmits vibrations to the filter 4 during soaking.

In the case of soaking inside a cleaning tank, to avoid introducing cleaning solution into the downstream section of the filtering support 4' of the filters via the outlet port 5b of the filter, it is possible to either keep the upper level of cleaning fluid a sufficient distance below the outlet port 5b of the filters during the entire soaking operation, or else to position water-tight stoppers in the outlet portion of the filters, following immersion of the filtering support 4' in the cleaning solution, thus preventing any cleaning fluid from entering the filter via its outlet port 5b.

After having carried out the cleaning-by-soaking operation on a number of filters inside the cleaning solution 3 contained in the soaking tank 2, it may be necessary to carry out treatment and regeneration of the cleaning solution. This regeneration and treatment of the cleaning solution may comprise filtering to remove the residues, chemical treatment or adding cleaning products.

The method according to the invention makes it possible to effectively unclog particulate filters by the use of straightforward and inexpensive means. Unclogging may be achieved solely by the method according to the invention or by combining this method with a cleaning process, for example by injecting fluid, as disclosed in patents 9907682 and 0105582. Accordingly, a complete cleaning installation may for example include a first installation for regenerating the filter in an oven or by passing hot gases over it, a second installation for soaking, and a third installation for cleaning, rinsing and drying.

The regeneration of the particulate filter may be carried out either on the filter after separating it from the exhaust line, or else on the motor vehicle prior to disassembling the section of the exhaust line incorporating the particulate filter.

The invention has applications in cleaning particulate filters on all types of motor vehicles.

What is claimed is:

1. Method for cleaning a particulate filter that has a filtering support with a porous structure, fixed in a metal casing having an inlet port and an outlet port, when in service the casing of the filter being joined to an upstream section of an exhaust line of a motor vehicle by its inlet port and to a downstream section thereof by its outlet port, comprising:

passing through the filter, between the inlet port and the outlet port, a stream of exhaust gases from the motor vehicle's engine containing particles of soot, of which at least a proportion that is retained by the filtering support undergoes combustion by being heated up in the filtering support, so as to regenerate the filter in the exhaust line, and after an operating period of the filter in the exhaust line such that the filtering support of the filter regenerated by combustion is at least partly choked by mineral residues and the filter operation has deteriorated:

disassembling at least part of the exhaust line incorporating the particulate filter in order to separate it from the motor vehicle; and contacting the filtering support with a cleaning solution for a period of time sufficient to ensure that the filtering support is soaked, so as to ensure or facilitate the detachment of the residues retained in the filtering support.

2. Cleaning method according to claim 1, wherein at least part of the filter incorporating the filtering support is introduced into a cleaning solution and the filtering support is kept in the cleaning solution to soak it.

3. Cleaning method according to claim 2, wherein the filtering support is introduced into and held in the cleaning solution in a position such that an axis of the filter and of the filtering support pointing in the direction in which the gases circulate between the inlet port and the outlet port of the filter is substantially vertical, and in a direction such that an exhaust gas inlet end is located beneath an outlet end thereof in the filtering support.

4. Cleaning method according to claim 2, wherein the filtering support is introduced into and held in the cleaning solution in a position such that the axis of the filter and of the filtering support pointing in the direction in which the gases circulate between the inlet port and the outlet port is substantially horizontal, soaking of the filter being done with the filter's outlet port obturated.

5. Cleaning method according to claim 1, wherein the cleaning fluid is introduced inside the casing of the filter and that soaking of the filtering support is done inside the casing of the filter.

6. Cleaning method according to claim 1, wherein in a second cleaning phase a stream of cleaning fluid is passed through the filtering support of the particulate filter, between an outlet end and an inlet end.

7. Method according to claim 1, wherein the cleaning fluid is maintained at room temperature while the filtering support of the filter is being soaked.

8. Method according to claim 1, wherein the cleaning fluid is heated to a temperature substantially higher than room temperature while the filtering support of the filter is being soaked.

9. Method according to claim 1, wherein during the cleaning operation consisting in soaking the filtering support of the filter, the cleaning fluid is agitated by one of mechanical agitation, ultrasonic agitation and circulating the cleaning solution by means of a pump.

10. Method according to claim 1, wherein displacement or agitation of the particulate filter is produced during the cleaning-by-soaking operation, in order to facilitate the detachment of residues deposited in the filtering support of the filter.

11. Method according to claim 2, wherein the part of the filter that includes the filtering support is introduced into the cleaning solution contained in a cleaning tank, a remaining part of the filter that includes the outlet port of the casing of the filter being sited above the level of the cleaning solution in the soaking tank, and the level of the cleaning solution in the tank is maintained at a substantially constant position.

12. Method according to claim 3, wherein the part of the filter that includes the filtering support is introduced into the cleaning solution contained in a cleaning tank, a remaining part of the filter that includes the outlet port of the casing of the filter being sited above the level of the cleaning solution in the soaking tank, and the level of the cleaning solution in the tank is maintained at a substantially constant position.

13. Method according to claim 1, wherein the outlet port of the casing of the filter is hermetically sealed following immersion of the filtering support in the cleaning solution, thereby preventing the cleaning solution from passing through the outlet port in the casing of the filter.

14. Method according to claim 1, wherein at the end of the soaking operation for cleaning the filtering support of the particulate filter, the filtering support of the particulate filter is subjected to rinsing and drying.

15. Method according to claim 1, wherein treatment and regeneration of the cleaning solution containing the particulate filter cleaning residues, either dissolved or in suspension, is carried out.

16. Method according to claim 1, wherein after disassembling the part of the exhaust line that incorporates the particulate filter, regeneration of the filtering support of the particulate filter is carried out by combustion of the soots present in the filtering support, using the method of holding the particulate filter in an oven at a temperature ensuring combustion of the soots, and thereafter placing the filtering support of the particulate filter in contact with the cleaning solution.

17. Method according to claim 1, wherein after disassembling the part of the exhaust line that incorporates the particulate filter, regeneration of the filtering support of the particulate filter is carried out by combustion of the soots present in the filtering support, using the method of passing a hot gas such as air through the filtering support of the particulate filter, so as to ensure combustion of the soots present in the filtering support, and thereafter placing the filtering support of the particulate filter in contact with the cleaning solution.

18. Method according to claim 1, wherein that the filter is regenerated on the exhaust line of the motor vehicle, prior to disassembling the section of the exhaust line that incorporates the particulate filter.

19. Installation for cleaning a particulate filter, wherein said installation comprises a cleaning or holding tank for cleaning solution and means for supporting at least one particulate filter in the cleaning or holding tank such that the filtering support of the particulate filter is immersed in a cleaning solution and an outlet port of a casing of the particulate filter is not contacted with the cleaning solution.

20. Method according to claim 1, wherein the particulate filter is associated with a catalyzer.

21. Installation according to claim 19, wherein the supporting means is such that the outlet port is maintained above the level of the cleaning solution.

22. Installation according to claim 19, wherein the outlet port is obturated by a stopper.

23. Installation according to claim 22, wherein cleaning solution is fed via a cleaning solution feed conduit which passes through the stopper.

* * * * *